United States Patent [19]
Thon et al.

[11] 3,893,284
[45] July 8, 1975

[54] LAWN MOWER AND COLLECTOR THEREFOR

[75] Inventors: Donald G. Thon, Middleburg Heights; Juergen Kaesgen, Brunswick, both of Ohio

[73] Assignee: MTD Products Inc., Cleveland, Ohio

[22] Filed: Dec. 20, 1973

[21] Appl. No.: 426,502

[52] U.S. Cl. ............................................. 56/202
[51] Int. Cl. ........................................... A01d 35/22
[58] Field of Search ........................... 56/194–206, 56/13.4, 17.5

[56] References Cited
UNITED STATES PATENTS
3,706,190  12/1972  Taub ................................. 56/13.4
3,726,069  4/1973  Cope ................................. 56/202
3,805,499  4/1974  Woelffer et al. .................. 56/202

*Primary Examiner*—Russell R. Kinsey
*Attorney, Agent, or Firm*—Woodling, Krost, Granger & Rust

[57] ABSTRACT

A grass mower and a grass collector attachable to the mower including a closure for the discharge port of the mower which closure automatically moves to closed position when the collector is removed from the mower and which closure may be opened upon attachment of the collector to the mower. Increased safety is provided by assuring that the discharge port is closed when the collector is not positioned over the port. This is an abstract only of the specific illustration of the invention given by way of example, and is not to be used in the interpretation of the claims nor as a limitation on the scope of the invention.

15 Claims, 5 Drawing Figures

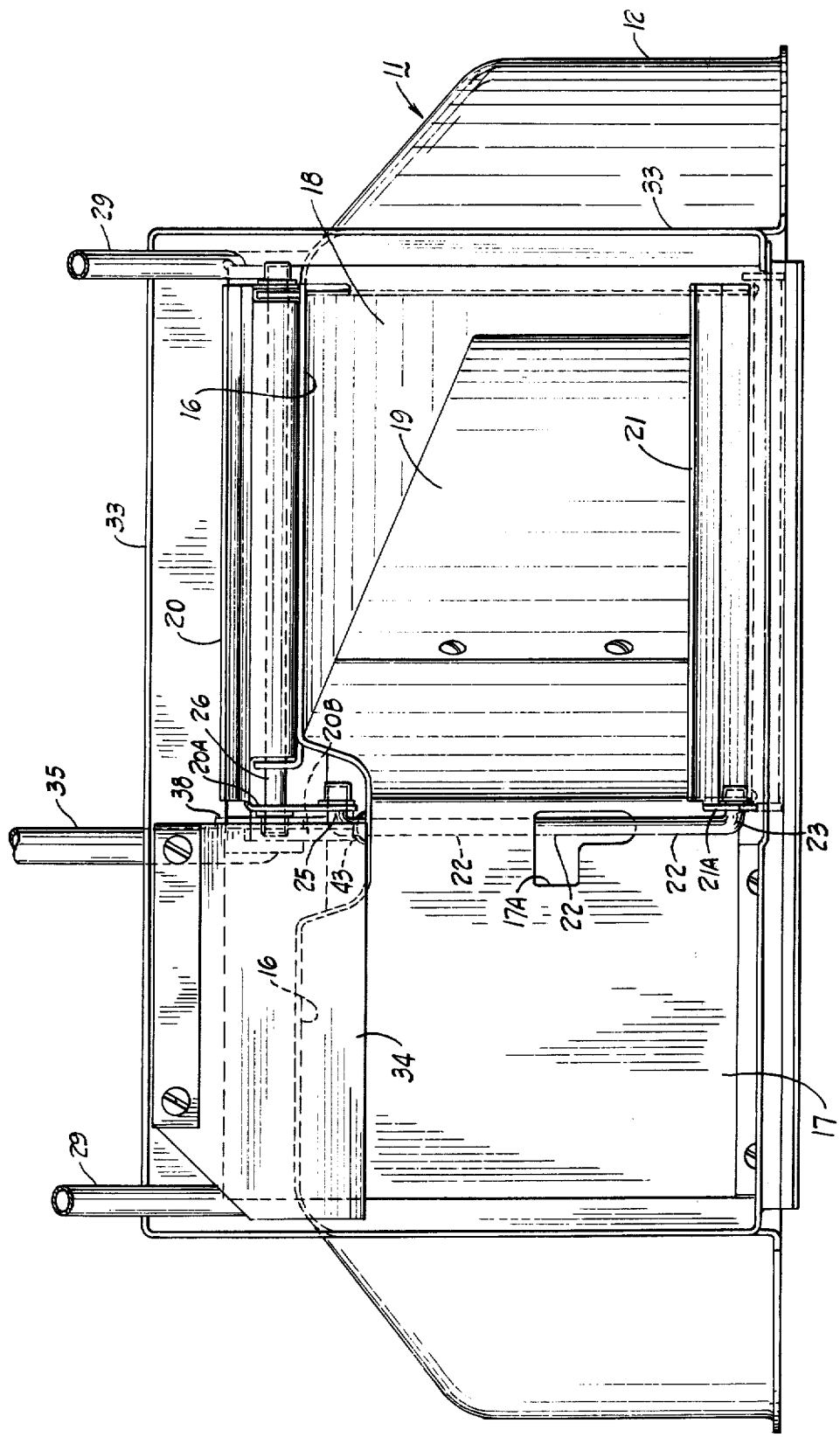

LAWN MOWER AND COLLECTOR THEREFOR

An object of our invention is to provide an improved mower having safety features to reduce the possibility of injury to the operator of the mower and persons in the vicinity of the mower.

Another object is the provision for assuring that the discharge port of the mower is always closed when the grass collector has been removed from its normal position at the discharge port at the opening. Such a closure of the discharge port when the collector is not in position assures that cut grass and other objects are not thrown out through the discharge port by the revolving blade of a rotary mower.

Another object is the provision for increasing safety in that when the grass collector has been removed from the mower, an operator or other persons may not insert their foot, hand or the like into the discharge port and thus be injured by the revolving blade.

Another object is the provision for a mower having a rear discharge port and a collector being carried by the mower at this rear discharge port and with a mechanism reducing the possibility that cut grass or other objects thrown by the revolving mower blade will be thrown rearwardly against the operator walking or positioned behind the mower.

Another object is the provision for a unique and improved arrangement for enhancing and improving the safety characteristics of a grass cutting mower.

Other objects and a fuller understanding of this invention may be had by referring to the following description and claims, taken in conjunction with the accompanying drawings, in which:

FIG. 5 is also a sectional view looking forwardly from the rear of the mower with the collector attached to the mower and with the closure at the discharge port in opened position.

Figure 1:
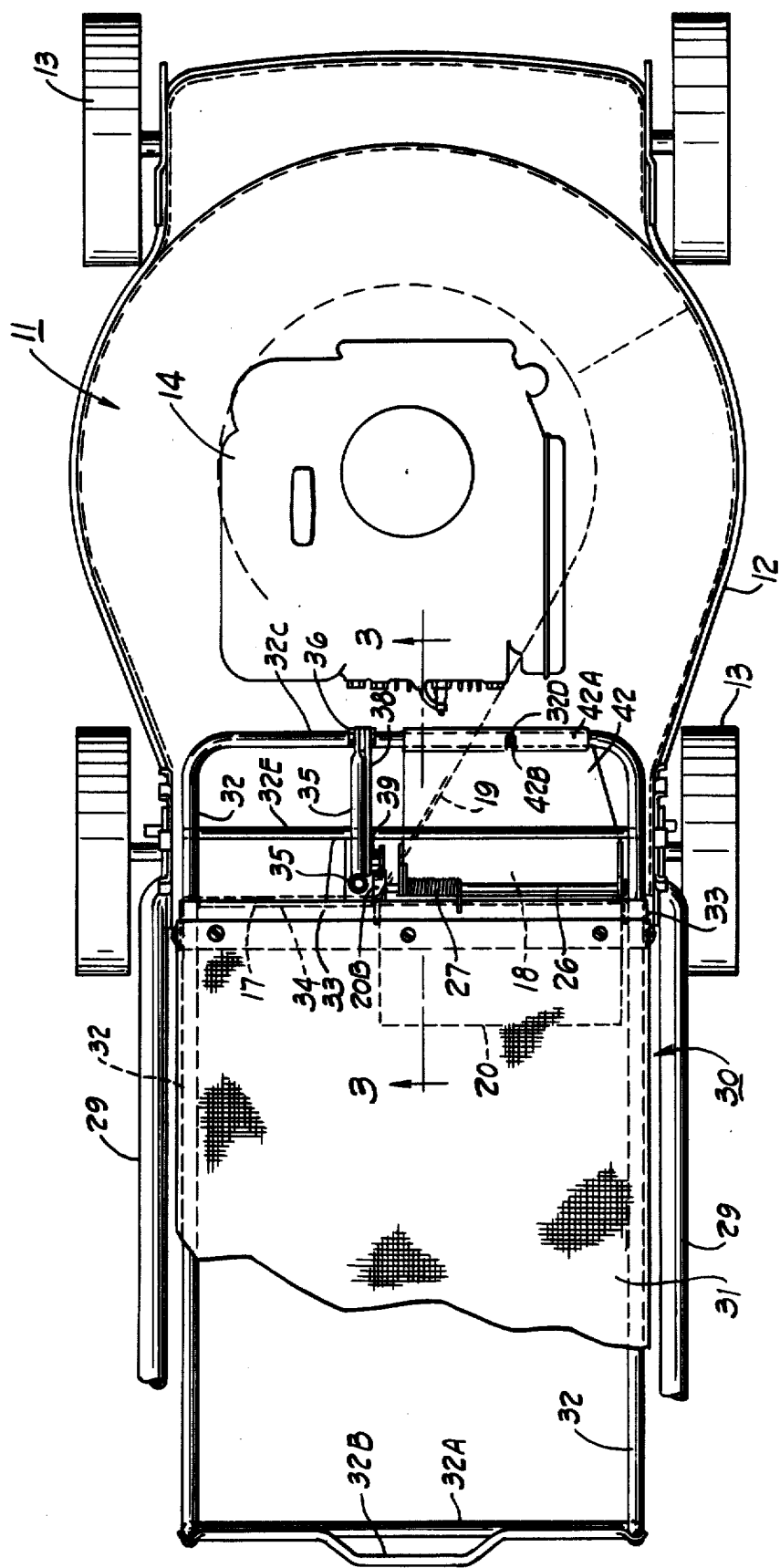
FIG. 1 is a plan view of a grass mower and collector mounted thereon and embodying our invention.

In the illustration of our invention we show a mower having a housing designated generally by the reference character 11. This housing 11 has sidewalls extending downwardly from the deck of the housing so as to enclose a rotating cutting blade 15 which is rotated by the energy of an engine 14 mounted upon the housing. As in the usual manner, there are four wheels 13 upon which the mower is carried so as to permit movement of the mower along a path to be mowed.

In our mower there is an enlarged rear opening 16 in the housing wall 12. As seen in the drawing, this rear opening 16 is directed rearwardly of the mower. Closing off approximately a half portion of this rear opening 16 is a vertical metal plate 17 secured to the mower. This leaves a discharge port 18 through which cut grass is thrown by force of the rotating blade 15. Other objects such as stones and other foreign material might also be thrown out through this discharge port 18 when picked up and thrown by the rotating blade 15. The housing 11 has an inner convolute chamber around which the cut grass and other objects are thrown in a swirling motion to where the grass and other objects emerge through the port 18. A baffle wall 19 within the housing 11 helps guide cut grass and other material within the housing 11 out through the discharge port 18.

A mower handle 29 extends upwardly and rearwardly from the housing so that the operator walking behind the mower and holding the handle may steer and manipulate the mower. A cut grass collector denoted generally by the reference character 30 is positioned rearwardly of the mower so as to receive cut grass therein discharged through the port 18. The forward end of the collector 30 is open so that cut grass and other material coming out through the discharge port 18 may be thrown or blown rearwardly up and into the collector 30.

The collector 30 is made up of a supporting metal frame 32 upon which is mounted a fabric bag 31. This fabric bag 31 is porous to permit air to flow through the fabric but at the same time, retaining in the collector the cut grass or other material.

The supporting frame 32 has two side upper portions which are joined by a lower crossbar 32A disposed in a U-shape. Extending across and joining at side wings of the lower rear crossbar 32A is an upper rear crossbar 32B which, as seen in the drawings, provides a convenient handle at the rear of the collector for lifting and manipulating the collector. There is a front crossbar 32C joining the side portions of the frame 32 at the forward end thereof. The general outline of the frame in plan view is of rectangular form. A reinforcing crossbar 32E joins the two side portions of the frame 32 at a location somewhat rearwardly of the front crossbar 32C so as to add rigidity to the frame 32.

Carried by the front crossbar 32C and extending upward therefrom is a pin 32D as better seen in FIG. 1. The purpose and function of this pin 32D will appear later in this description.

Joining the fabric bag 31 to the frame 32 is a rectangular metal frame 33. This supports the fabric bag at the forward end of the collector and provides for a rigid rectangular opening at the forward end of the collector. Carried by and extending downwardly from the frame 33 is a rubber flap 34, better seen in FIG. 5, which helps to seal off any opening or crack between the plate 17 carried by the mower and the forward portion of frame 33 on the left-hand side as shown in FIG. 5.

Figure 2:
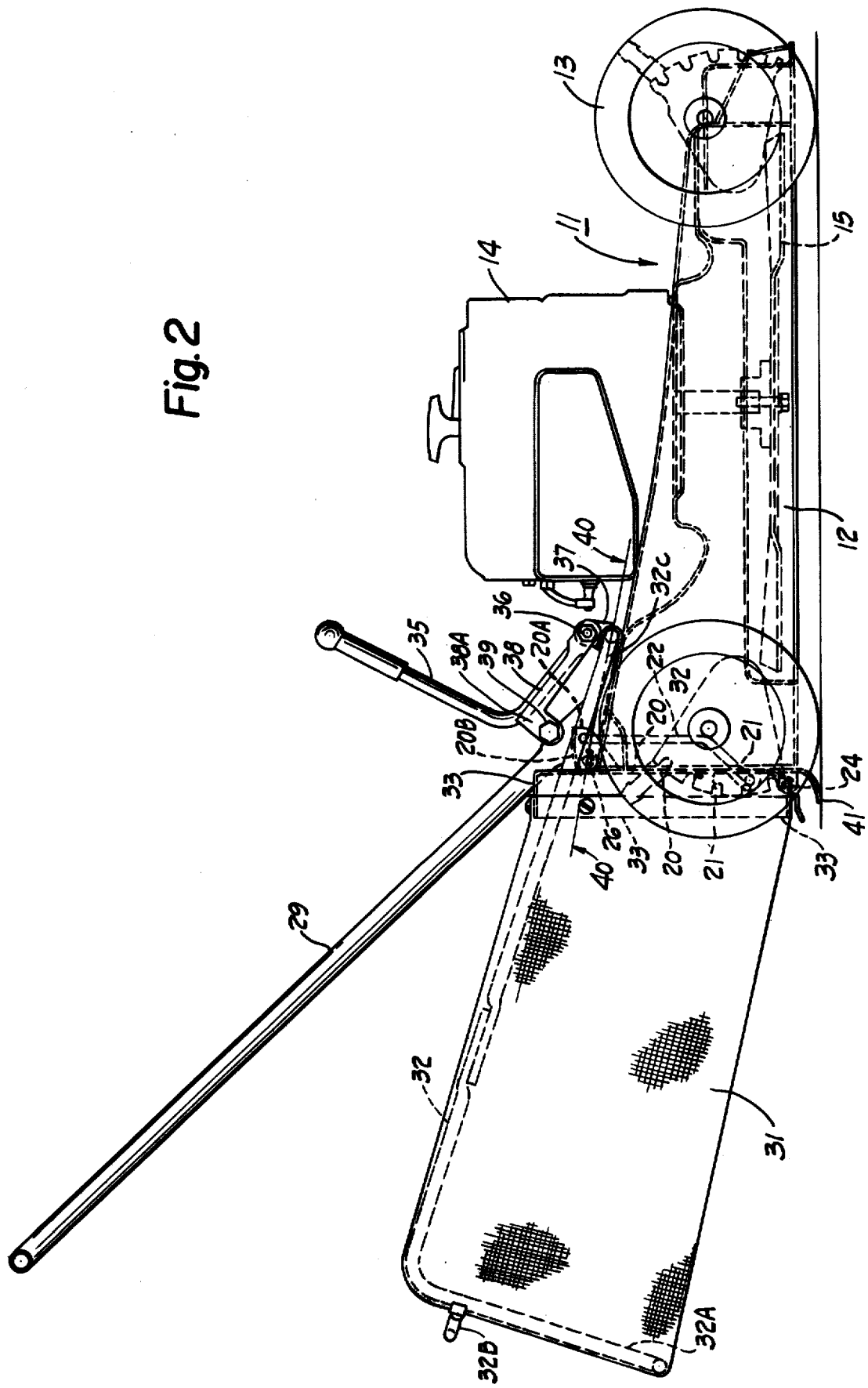
FIG. 2 is a side view of the mower and collector shown in FIG. 1.

There is provided for closing off the discharge port 18 a closure made up of an upper door 20 and a lower door 21. These doors are pivotally swingable on parallel horizontal axes. When the doors 20 and 21 are in their open position, they assume the locations illustrated in FIGS. 3 and 5. When in their closed position, they are in the locations illustrated in FIGS. 2 and 4.

Figure 4:
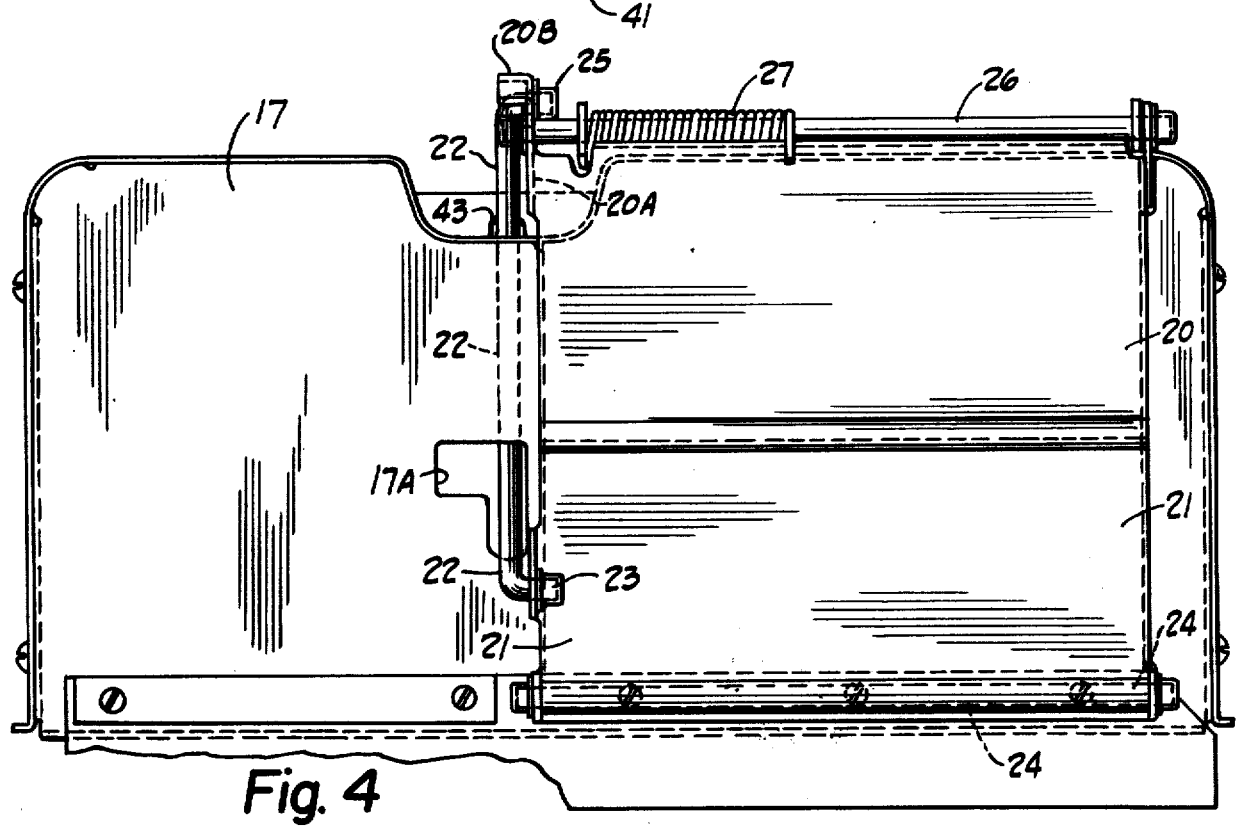
FIG. 4 is an enlarged view looking forwardly from the rear of the mower with the collector removed from the mower, and showing the closure in closed position over the discharge port.

The lower door has secured thereto along one of its vertical edges a pivotal connection 23. There is a pivotal connection 25 secured to the upper door 20 along the vertical edge thereof. A rod or bar 22 links the upper door 20 and lower door 21 together by the pivotal connection of the lower end of rod 22 with the pivotal connection 23 and by the upper end of the rod 22 with the pivotal connection 25 of the upper door 20. An opening 17A is provided in the plate 17 to permit the rod 22 to move therethrough. The rod 22 also extends through a hole 43 in the top wall of the housing 11 so as to permit the upper portion of the rod 22 to extend upwardly as shown in FIGS. 4 and 5.

The lower door is pivotally carried on a pivot pin 24 journaled on the housing and the upper door 20 is pivotally carried on a pivot pin 26 journaled on the housing. A coil spring 27 encircling the pivot pin 26 so interengages the housing 11 and the upper door 20 and is under such tension as to resiliently urge the upper door 20 downwardly. By reason of the interconnection of the two doors through the rod 22 the urging of the upper door downwardly concurrently urges the lower door 21 upwardly whereby under the biasing effect of the spring 27 the doors 20 and 21 are biased toward a vertical position, as shown in FIG. 4 and thus to close off the discharge port 18. In the absence of a force to overcome the bias of the spring 27, the closure made up of doors 20 and 21 moves to a closed position so as to prevent ingress and egress through the discharge port 18.

Figure 3:
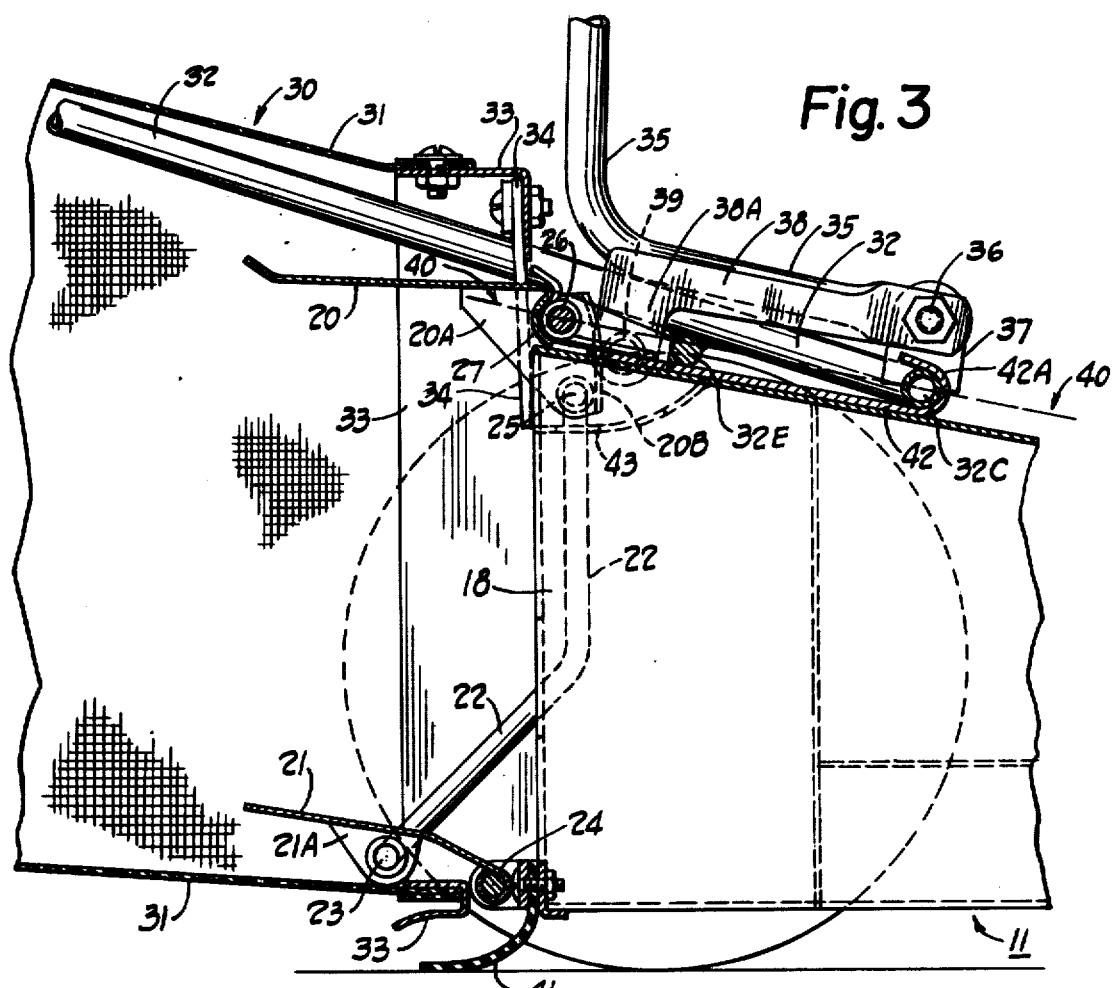
FIG. 3 is an enlarged sectional view taken through the line 3—3 of FIG. 1, showing the closure for the discharge port in opened position.

The upper door 20 has rigidly secured thereto a bracket 20A which supports the pivot connection 25 for the rod 22. This bracket 20A has a camming surface 20B provided by a bent-over edge portion of the bracket 20A. The contour of the camming surface 20B is best seen in FIGS. 3 and 4. It will be observed that movement of the bracket 20A simultaneously causes movement of the upper door 20 which through the rod 22 moves the lower door 21.

Mounted upon the front crossbar 32C of the frame 32 is a bracket 37. Pivotally secured to the bracket 37 by a pivot connection 36 is a lever 35. This lever 35 has two portions disposed generally at right angles to each other. Also secured to the bracket 37 by the pivot connection 36, and welded or otherwise firmly secured to the lever 35, is an angular member 38. This angular member 38 has a downwardly projecting portion 38A as best seen in FIG. 3. Carried by the downwardly projecting portion 38A near the lower end thereof is a stud or bolt having an axis generally parallel to the axis of the pivot pin 26 upon which the upper door 20 is pivotally carried. This stud or bolt 39 is positioned so as to interengage with the camming surface 20B of the bracket 20A. As seen in FIG. 3, the camming surface 20B has a curvature and the stud 39 upon engaging the camming surface 20B acts as a camming member. Downward movement of the camming member provided by the stud 39 presses downwardly upon the camming surface 20B and at the same time as the camming surface 20B is tilted or swung under the force of the stud 39, the stud 39 cammingly slides down along the camming surface 20B to approximately the position illustrated in FIG. 3. When the lever has been swung back to the position shown in FIG. 3 and the downward tilting of the camming surface 20B has caused the upper door 20 to be swung upwardly and the lower door 21 to be swung downwardly as illustrated, then the camming member formed by the stud 39 has been moved beyond the reference line 40 shown in FIG. 3. This reference line 40 is drawn through the axis of the front crossbar 32C and the axis of the pivot pin 26. The resilient urging of the pring 27 tends to cause the camming surface 20B to swing upwardly and the doors 20 and 21 to close. However, since the camming member 39 provided by the stud has been overthrown, that is beyond the reference line 40, then the resilient action of the spring 27 tends to cause the camming surface 20B to press forwardly against the camming member 39 and thus to resist upward movement of the camming member 39 away from its position shown in FIG. 3. The interaction of the camming member 39 with the camming surface 20B under the biasing influence of the spring 27 tends to cause the parts to stay locked in the position illustrated in FIG. 3.

A bracket 42 is welded or otherwise secured to the housing 11 of the mower just forwardly of the discharge port 18. This bracket 42 has a socket portion 42A formed at the forward end thereof by curling or curving over the forward edge portion of the bracket 42. This provides an elongated socket disposed transversely of the mower and into which the forward crossbar 32C of the frame 32 may be inserted by forward motion of the frame 32 to cause the crossbar 32C to enter the open mouth of the socket portion 42A. As better seen in FIG. 1, this socket portion 42A has a small slot or notch 42B formed therein which slot is open from the rearward edge of the socket portion 42A. The upwardly standing pin 32D which is secured to the front crossbar 32C, and previously referred to, is adapted to slidably fit into this small slot or notch 42B. This prevents lateral movement of the front crossbar 32C and hence holds the whole frame 32 relative to the housing 11 of the mower. The fit of the pin 32D in the slot or notch 42B however, is such as to permit rotation of the crossbar 32C within the socket portion 42A and therefore to permit upward and downward swinging of the frame 32 pivotally about the axis of the socket portion 42A.

Upon the lever 35 being swung downwardly in the position shown in FIG. 3 so that the camming member 39 has been overthrown beyond the reference line 40, it is seen that the front crossbar 32C is firmly locked in the socket portion 42A of the bracket 42. When in this position the collector can not be removed from the mower and in this secured and locked position the closure provided by doors 20 and 21 is in an open position as shown in FIG. 3.

There is a customary resilient rubber or rubber-like skirt 41 attached to the rear of the mower below the discharge port 18 and this assumes the position shown in FIG. 3 upon forward movement of the mower.

When it is desired to remove the collector from the mower, such as when it is desired to empty the contents of the collector, the upward end of the lever 35 is swung forwardly on the pivot connection 36. This raises the stud 39 carried by the projection 38A upwardly along with the lever 35. This manual forward movement of the lever 35 overcomes the resilient urging of the spring 27 sufficiently to permit the camming member 39 to move upwardly along the camming surface 20B. Upon the camming member 39 freeing or clearing the camming surface 20B, then the bracket 20A swings upwardly under the urging of the spring 27 and this in turn causes the upper door 20 to swing downwardly and the lower door 21 to swing upwardly and thus closing off automatically the discharge port 18. Thus when the collector 30 is removed, ingress and egress through the discharge port 18 is blocked. Grass and other objects may not be thrown outwardly of the discharge port by the rotating blade 15 of the mower because the discharge port is blocked or closed by the doors 20 and 21. Likewise an operator or other person may not put their foot or hand through the discharge port 18 into the housing of the mower for possible injury by the rotating blade 15 because the discharge port 18 is automatically closed off by the doors 20 and 21 when the collector has been removed from the mower.

There is thus provided an important safety mechanism which limits the undesirability and sometimes danger of cut grass and other objects being thrown outwardly of the mower through the discharge port when the collector is removed. Also this safety mechanism prevents an operator or other person from inadvertently inserting a foot or hand through the discharge port into the mower housing for injury by the rotating blade. Of course, when the collector is in firmly mounted position, such as illustrated in FIG. 3, then the collector itself prevents a person from inserting a foot or a hand into the discharge opening 18. Also when the collector is in its mounted position shown in FIG. 3 then cut grass and other objects thrown out by the rotating blade through the discharge port are received in the collector.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a lawn mower having grass cutting means, a housing for the grass cutting means, the housing having a discharge port in a wall thereof through which cut grass is discharged outwardly of the housing, the combination of a movable closure carried by the housing for blocking said discharge opening when in closed position and for opening up said discharge port in opened position, said closure being subject to bias to urge the closure toward said closed position, a collector for collecting cut grass discharged through said discharge port, said collector being adapted to be mounted upon said housing adjacent said discharge port, a bracket carried by said housing adjacent said discharge port adapted to interengage with said collector upon positioning the collector adjacent said discharge port, operable linkage means carried by said housing for moving said closure to said opened position in opposition to said bias, and pivotal lever means carried by said collector and located to interengage with said linkage means upon interengagement of said bracket and said collector, said pivotal lever means and said linkage means including overthrow means for holding said lever means in a locked position upon swinging the lever means in a direction to interengage with said linkage means and sufficiently to operate said linkage means to move the said closure to said opened position, said lever means in said locked position retaining said collector interengaged with said bracket and in position for receiving cut grass discharged through said discharge port, the said lever means upon being swung in an opposite direction to an unlocked position disengaging said linkage means to permit said linkage means to operate so as to permit said closure under the urging of said bias to move to said closed position, said lever means upon being swung to said unlocked position permitting the said collector to be released from retention be said bracket.

2. The combination claimed in claim 1 and in which said closure is comprised of an upper and lower door pivotally carried by said housing on spaced parallel horizontal axes, and said linkage means includes connecting means connecting said doors to cause them to swing in unison between opened position and closed position.

3. The combination claimed in claim 2 and in which the bias urging the closure toward closed position is provided by a spring operably engaging one of said doors to urge it toward closed position.

4. The combination claimed in claim 3 and in which said overthrow means includes an interengageable camming surface and camming member, said camming surface being carried by one of said lever means and said linkage means and said camming member being carried by the other of said lever means and said linkage means, the camming member upon moving the camming surface beyond a reference point overthrowing the linkage means to hold the closure in said opened position.

5. The combination of a lawn mower having a discharge port through which cut grass is discharged and a collector attachable to the mower for collecting cut grass discharged through said port, said mower having closure means which is in the position of closing said port when the collector is not attached to the mower and is in another position such that the port is open when the collector is attached to the mower, biasing means carried by the mower for biasing said closure means to closed position when the collector is not attached to the mower, actuating means carried by said mower for moving said closure means to said another position against the urging of said biasing means, mounting means carried by the mower for the mounting of said collector to the mower, operating means carried by the collector for actuating said actuating means, and cooperable interengageable camming means carried by the operating means and actuating means for moving the actuating means upon movement of the operating means in a first direction to move the closure means to opened position and for concurrently holding the collector engaged to said mounting means, movement of the operating means in an opposite direction permitting the actuating means to move the closure means under the urging of said biasing means to closed position and permitting the collector to be disengaged from said mounting means.

6. The combination claimed in claim 5 and in which said closure means comprises a pair of pivotally swingable doors movable relative to each other in one direction to open said port and in another direction to close said port, said actuating means interconnecting said doors to provide for their movement in unison in which said biasing means comprises a spring urging a said door to move toward closed position, and said operating means includes lever means pivotally carried by said collector.

7. The combination claimed in claim 5 and in which said cooperable interengageable camming means includes a first camming element carried by and movable with said closure means and a second camming element carried by and movable with said operating means, interengagement of the first camming element and second camming element and the movement of said operating means in a first direction causing the said first camming element to move in a direction that moves the closure means to opened position, the disengagement of the said first and second camming elements and the movement of the operating means in an opposite direction permitting the said first camming element to move in another direction that permits the closure means to move under the bias of the biasing means to closed position.

8. The combination as claimed in claim 6 and in which said biasing means is a spring operably engaging one of said doors, said cooperable interengageable camming means includes a camming surface movable with one of said doors and a camming member movable with said operating means, the movement of the operating means in one direction causing the camming member to cammingly engage said camming surface and to move in a direction to move said one door to opened position, the movement of the operating means in an opposite direction causing the camming member to disengage said camming surface to permit it to move in an opposite direction and to allow said one door to move to closed position under the bias of said biasing means.

9. The combination as claimed in claim 5 and including cooperable locking means carried by the operating means and mounting means for locking said collector mounted to said mower upon movement of the operating means and actuating means to a position in which said closure means is opened.

10. The combination as claimed in claim 9 and in which said operating means is held in position to lock the collector to the mower by said actuating means being moved sufficiently by the operating means to a position wherein the bias of said camming means is overcome to permit movement of the actuating means.

11. The combination of grass mower means, collector means mountable on said mower means for collecting cut grass discharged by the mower means through a discharge port therein, closure means carried by the mower for closing said port in one position of the closure means and for opening said port in another position of the closure means, biasing means carried by said mower means for urging said closure means to closed position, mounting means associated with said collector means and said mower means for attaching said collector means to the mower means in position to receive cut grass discharged through said port, actuating means independent of said collector means and carried by the mower for moving said closure means to open position against the bias of the biasing means and for permitting said closure means under the urging of said biasing means to move to closed position without dependence upon the attachment and disattachment of the collector means to the mounting means, and operating means carried by, and movable relative to, the collector means to operate said actuating means upon the attachment of the collector to the mounting means and the manual movement of the operating means in a direction to operate the actuating means.

12. The combination claimed in claim 11 and in which said closure means in open position extends into the collector means, and in which the actuating means and operating means cooperate to prevent removal of the collector means from the mower means until after the operating means has been moved in a direction to permit the actuating means to move to a position allowing the closure means to move under the urging of the biasing means to closed position.

13. In combination with a grass mower and a collector attachable to the mower for collecting cut grass discharged through a port in the mower, first means carried by said mower for closing said port, second means carried by said mower for opening said port independently of the attachment of said collector to said mower, third means carried by the mower for automatically causing the first means to close the port when the collector is not attached to the mower, fourth means carried by said mower and disposed to oppose the said third means for causing the second means to open said port when the collector is attached to the mower, fifth means carried by, and movable relative to, said collector for operating said forth means upon movement of the fifth means relative to said collector, and sixth means carried by said mower and said collector for locking the collector attached to the mower upon the opening of the port by the fourth means.

14. The combination claimed in claim 13 and in which said third, fourth and fifth means cooperate to prevent dis-attachment of the collector from the mower after the port has been opened by the second means until after the port is closed by first means.

15. The combination of a grass mower having a discharge port, a grass collector mountable to said mower for collecting cut grass discharged through said discharge port, a movable closure carried by said mower for said port, closing means carried by, and movable relative to, the mower for automatically moving the closure to close the port in the absence of the collector from the port, engaging means extending from and operatively connected to said closure for moving the closure to open position upon movement of the engaging means in one direction, and opening means carried by, and movable relative to, the collector to operatively engage said engaging means to move the said engaging means in said one direction for moving the closure to open position, in opposition to said closing means, upon attachment of the collector to the mower and the operation of said opening means relative to said collector in a movement directed to move the said engaging means in said one direction.

* * * * *